United States Patent [19]

Lampredi

[11] 4,063,537
[45] Dec. 20, 1977

[54] COMBUSTION CHAMBERS, FOR DIESEL ENGINES

[75] Inventor: Aurelio Lampredi, Turin, Italy

[73] Assignee: Fiat Societa Per Azioni, Turin, Italy

[21] Appl. No.: 660,888

[22] Filed: Feb. 24, 1976

[30] Foreign Application Priority Data

Mar. 21, 1975 Italy .................................. 67710/75

[51] Int. Cl.² ............................................. F02B 3/00
[52] U.S. Cl. ................................ 123/32 B; 123/30 D; 123/193 P
[58] Field of Search .............. 123/30 C, 30 D, 32 B, 123/32 C, 191 B, 191 C, 191 S, 191 SP, 193 P, 193 CP, 193 R

[56] References Cited

U.S. PATENT DOCUMENTS

| 2,113,711 | 4/1938 | Ricardo | 123/32 C |
|---|---|---|---|
| 2,571,535 | 10/1951 | Buchi | 123/32 B |
| 2,827,033 | 3/1958 | Bodine | 123/191 B |
| 2,935,054 | 5/1960 | Franke | 123/32 B |
| 3,105,470 | 10/1963 | Hockel | 123/32 B |
| 3,196,857 | 7/1965 | Zimmermann | 123/32 C |
| 3,924,580 | 12/1975 | Taira | 123/193 P |

FOREIGN PATENT DOCUMENTS 2,313,214   9/1973   Germany ......................... 123/32 C Primary Examiner—Charles J. Myhre
Assistant Examiner—William Randolph
Attorney, Agent, or Firm—Sughrue, Rothwell, Mion, Zinn and Macpeak

[57] ABSTRACT

A combustion chamber for a diesel engine has a secondary chamber, communicating with a precombustion chamber, the secondary chamber consisting of a central channel extending diametrically in the piston crown and having at its discharge end two branches, forming an anchor configuration, which induce turbulence in the combustion gases, grooves being provided in the piston crown to trap gases escaping from the central channel.

3 Claims, 2 Drawing Figures

COMBUSTION CHAMBERS, FOR DIESEL ENGINES

BACKGROUND OF THE INVENTION

The present invention concerns improvements in combustion chambers for compression-ignition engines, that is, diesel engines.

In diesel engines of the type having precombustion chambers each combustion chamber is generally formed partly in the cylinder head and partly in the crown of the associated piston. At the end of the compression stroke fuel is injected into the portion of the combustion chamber located in the cylinder head, known as the precombustion chamber, in which the combustion starts. Subsequently a flame front is propagated, through an appropriate suitably shaped channel, from the precombustion chamber to a secondary combustion chamber formed in the piston crown, transmitting to the piston the driving thrust produced by the pressure of the burnt gases. The operating characteristics of the engine, such as, for example, power, specific consumption, noise and degree of smoke, are in part determined by the conformation of the aforesaid and the channel interconnecting them.

The object of the present invention is to improve the operating characteristics of a diesel engine of the aforesaid type, by suitably increasing the size of the secondary chamber and so shaping it as to ensure efficient exhaustion of the combustion gases.

SUMMARY OF THE INVENTION

According to the present invention there is provided a combustion chamber for a compression-ignition or diesel engine in which part of the combustion chamber is situated in a crown of a piston and is substantially anchor-shaped, with a central elongate channel extending along a diametrical axis of the piston crown, there being at least one pair of grooves in the piston crown, spaced from the said elongate channel, for the purpose of trapping gases escaping from the said central channel during combustion of gases therein.

BRIEF DESCRIPTION OF THE DRAWINGS

The invention will now be further described, by way non-limiting example, with reference to the appended drawings, in which.

DETAILED DESCRIPTION OF THE ILLUSTRATED EMBODIMENT

Figure 1:
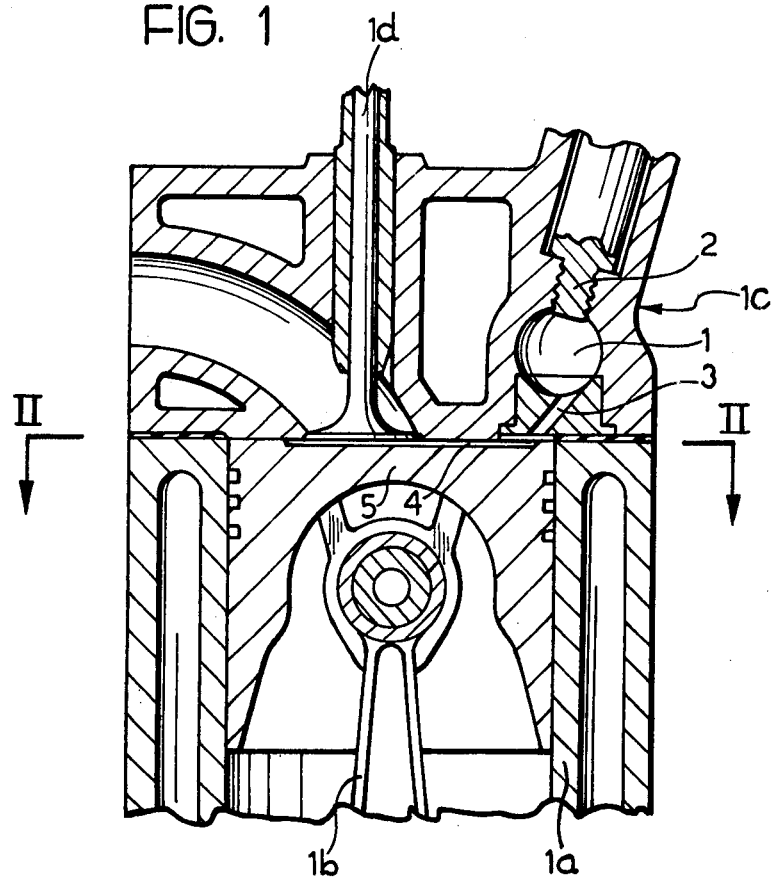
FIG. 1 is a partial axial section of a cylinder of a diesel engine provided with a combustion chamber according to one embodiment of the invention.

With reference to the drawings, 1a indicates a cylinder of a traditional internal combustion compression-ignition or diesel engine housing a piston 5 attached to a connecting rod 1b. The cylinder 1a is surmounted by a cylinder head 1c provided with inlet and exhaust valves 1d.

A combustion chamber is formed by a precombustion chamber 1 of conventional conformation positioned in the cylinder head 1c and aligned with a fuel injector 2. A flame duct 3 communicates with the precombustion chamber 1 and leads into a secondary chamber 4 formed in the crown of the piston 5.

Figure 2:
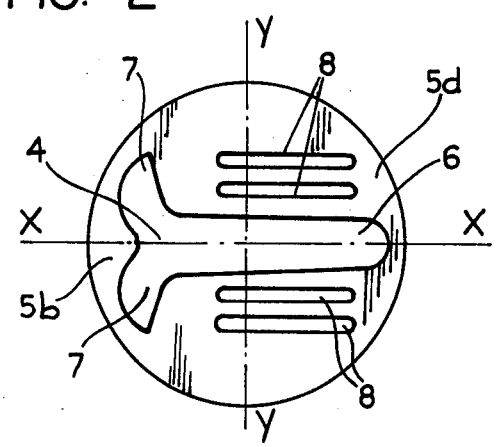
FIG. 2 is a partial cross-section taken along the line II—II of FIG. 1.

According to the present invention the secondary chamber 4 has an anchor shape in plan (FIG. 2), with a central elongate channel 6, symmetrical with respect to a diametrical axis X—X of the piston crown. The flame duct 3 communicates with one end of the elongate channel 6, in a portion 5d of the piston crown. The elongate channel 6 extends to another portion 5b of the piston crown, on the opposite side of a diametrical axis Y—Y from the portion 5d, at which the channel 6 bifurcates into two branches 7.

Parallel to the elongate channel 6 of the secondary chamber 4 there are provided one or more grooves 8 (four in this example) of elongate narrow form with a depth approximately half that of the central elongate channel 6.

The principal difference between the anchor-shape secondary chamber 4 and those previously used in diesel engines having precombustion chambers lies in the fact that the central elongate channel 6 is extended well beyond the diametrical axis Y—Y of the piston crown so that the branches 7 are disposed in proximity to the rim of the piston crown, at some distance from the said diametrical axis Y—Y, which is perpendicular to the axis X—X. This allows a more uniform propagation of the combustion gases over the surface of the piston. Thus the gases coming out of the flame duct 3 are guided along the elongate channel 6 of the secondary chamber 4 to traverse almost the entire crown of the piston, before assuming turbulent motion caused by the two branches 7 of the chamber 4.

The grooves 8 fulfill the function of expansion chambers, to contain the gases which tend to escape laterally from the central channel 6 of the secondary chamber 4 before being conveyed into the branches 7.

The two branches 7 of the anchor-shaped secondary chamber 4 therefore impart turbulent movement to the combustion gases leaving the chamber 4, ensuring efficient atomization of the combusted mixture.

From the preceding description it will be noted that optimum operating characteristics of the engine can result, without recourse to complex ancillary devices, by simply making use of a particular configuration of the combustion chamber formed in the crown of the piston, thereby affording a considerable economic advantage as regards manufacture of the combustion chamber.

It will be understood that construction details of practical embodiments of the invention can be widely varied with respect to what has been described and illustrated, without, however, departing from the scope of the present invention.

I claim:

1. In a compression-ignition engine having a piston and a combustion chamber situated in the crown of the piston, the improvement wherein the combustion chamber is substantially anchor-shaped, with a central elongate channel extending along a diametrical axis of the piston crown, and wherein there is at least one pair of elongate grooves in the piston crown, parallel to and spaced from the said elongate channel on opposite sides of said channel, for the purpose of trapping gases escaping from the said central channel during combustion of gases therein.

2. The combustion chamber defined in claim 1, wherein the said central channel has a discharge end which terminates in two branches which are adapted to impart turbulent movement to the gases leaving the combustion chamber.

3. A piston for a compression-ignition engine comprising a piston crown in which part of a combustion chamber is defined, the said combustion chamber being substantially anchor-shaped, with a central elongate channel extending along a diametrical axis of the piston crown, and wherein there is at least one pair of elongate grooves in the piston crown, parallel to and spaced from the said elongate channel on opposite sides of said channel, for the purpose of trapping gases escaping from the said central channel during combustion of gases therein.

* * * * *